(12) United States Patent
Burns

(10) Patent No.: US 9,839,984 B2
(45) Date of Patent: Dec. 12, 2017

(54) METHOD OF MAKING A CUTTING TAP WITH A CORRECTION GRIND

(71) Applicant: Kennametal Inc., Latrobe, PA (US)

(72) Inventor: Steven R. Burns, East Ryegate, VT (US)

(73) Assignee: KENNAMETAL INC., Latrobe, PA (US)

( * ) Notice: Subject to any disclaimer, the term of this patent is extended or adjusted under 35 U.S.C. 154(b) by 387 days.

(21) Appl. No.: 14/459,794

(22) Filed: Aug. 14, 2014

(65) Prior Publication Data

US 2016/0045995 A1 Feb. 18, 2016

(51) Int. Cl.
*B24B 3/22* (2006.01)
*B23G 5/06* (2006.01)
*B23P 15/52* (2006.01)
*B24B 19/04* (2006.01)

(52) U.S. Cl.
CPC ............... *B24B 3/22* (2013.01); *B23P 15/52* (2013.01); *B24B 19/04* (2013.01); *B23G 5/06* (2013.01)

(58) Field of Classification Search
CPC .. B24B 19/04; B24B 3/22; B26G 5/06; B23P 15/52; B23G 2200/04; B23G 2210/04; B23G 2200/48; B23G 2210/16; Y10T 408/9048; Y10T 408/8734; Y10T 408/904; B27G 15/00; B23B 51/00
USPC ............... 76/101.1; 408/222, 219, 215–218; 470/198, 199; 29/428; 148/276
See application file for complete search history.

(56) References Cited

U.S. PATENT DOCUMENTS

| | | | | |
|---|---|---|---|---|
| 750,537 | A * | 1/1904 | Hanson | B23B 51/02 408/230 |
| 2,966,081 | A * | 12/1960 | Kallio | B23B 51/02 408/230 |
| 3,701,188 | A * | 10/1972 | Wall | B23B 51/08 144/240 |
| 3,947,143 | A * | 3/1976 | Gulla | B23B 31/005 408/226 |
| 4,462,727 | A * | 7/1984 | Marburger | B23G 5/06 408/220 |
| 4,470,733 | A * | 9/1984 | Marques, Jr. | B23B 51/02 144/240 |
| 7,001,113 | B2 | 2/2006 | Flynn et al. | |
| 7,144,208 | B2 | 12/2006 | Henderer et al. | |
| 7,284,935 | B2 | 10/2007 | Povich | |
| 7,367,754 | B1 | 5/2008 | Greenwood et al. | |
| 7,553,114 | B2 | 6/2009 | Oknestam et al. | |
| 7,665,934 | B2 | 2/2010 | Henderer et al. | |
| 7,934,890 | B2 | 5/2011 | Takagi et al. | |
| 7,950,880 | B2 | 5/2011 | Henderer et al. | |

(Continued)

FOREIGN PATENT DOCUMENTS

| | | |
|---|---|---|
| JP | 4075816 B2 | 4/2008 |
| JP | 2008272856 | 11/2008 |
| WO | 2013132665 A1 | 9/2013 |

*Primary Examiner* — Ghassem Alie
(74) *Attorney, Agent, or Firm* — Matthew S. Bedsole

(57) ABSTRACT

A method of making a cutting tap includes: providing an elongate tap body having an axial forward end, an axial rearward end and a central longitudinal axis; securing the axial rearward end of the tap body in a grinding machine; and forming in the axial forward end of the tap body a correction grind and a main flute in one continuous grinding operation. A cutting tap made by the invention is also provided.

17 Claims, 7 Drawing Sheets

(56) References Cited

U.S. PATENT DOCUMENTS

| | | |
|---|---|---|
| 8,186,915 B2 | 5/2012 | Nakajima et al. |
| 2006/0067797 A1 | 3/2006 | Calamia |
| 2009/0317203 A1 | 12/2009 | Nakajima et al. |
| 2010/0260566 A1 | 10/2010 | Glimpel et al. |
| 2011/0097976 A1* | 4/2011 | Muhlfriedel ............ B23B 51/02 451/48 |
| 2011/0200404 A1 | 8/2011 | Norimatsu et al. |
| 2011/0312253 A1* | 12/2011 | Shimizu .................. B23C 5/10 451/45 |
| 2012/0134761 A1 | 5/2012 | Nakajima et al. |
| 2013/0039709 A1 | 2/2013 | Goh et al. |
| 2014/0212234 A1* | 7/2014 | Sawabe ............... B23B 51/0018 408/1 R |

* cited by examiner

METHOD OF MAKING A CUTTING TAP WITH A CORRECTION GRIND

BACKGROUND OF THE INVENTION

The present invention relates to a cutting tap and, more particularly, relates to a method of making a cutting tap with a correction grind.

Mechanisms and machine components requiring screw threads have had a long history in many technologies. In this regard, the use of screw threads as a fastener component has consistently dominated over all other means to join component parts into assemblies. Thus, it can be appreciated that articles used to form screw threads are essential to many manufacturing technologies.

Although there are many ways to generate internal screw threads, cutting taps are the favored way to generate an internal screw thread. One known tapping method to generate internal screw threads includes cutting material from the wall of a hole and then removing the same to produce a helical V-shaped screw thread. In the alternative, material can be displaced to form an internal screw thread.

Known cutting taps for blind holes typically include one or more spiral or helical flutes to facilitate chip removal during the thread cutting process. A correction grind can be provided, which is generally a secondary or small flute at the front of the tap that is superimposed upon a primary or main flute of the tap to change cutting characteristics in the cutting zone. This type of correction grind is formed or made as a secondary grinding operation. As a result, there is always a sharp, distinct transition between the correction grind and the main flute. This transition zone can be detrimental to tap performance because the cutting geometry changes abruptly there.

Accordingly, there has been identified a need for an improved cutting tap that overcomes limitations, shortcomings and disadvantages of known cutting taps. There has also been identified a need for an improved method of making a cutting tap that overcomes limitations, shortcomings and disadvantages of known methods of making cutting taps.

SUMMARY OF THE INVENTION

In accordance with an aspect of the invention, a method of making a cutting tap includes: providing an elongate tap body having an axial forward end, an axial rearward end and a central longitudinal axis; securing the axial rearward end of the tap body in a grinding machine; and forming in the axial forward end of the tap body a correction grind and a main flute in one continuous grinding operation. A cutting tap made by the invention is also disclosed.

In accordance with another aspect of the invention, a method of making a cutting tap includes: providing an elongate tap body having an axial forward end terminating in a point, an axial rearward end including a shank and a central longitudinal axis; securing the shank of the tap body in a grinding machine; forming in the axial forward end of the tap body a correction grind adjacent the axial forward end and a main flute axially rearward of the correction grind in one continuous grinding operation, wherein the correction grind and the main flute are ground sequentially while the tap body remains secured in the grinding machine; and further including forming the correction grind and the main flute to have a continuously variable helix angle that increases from low to high beginning at the axial forward end of the tap body and extending rearwardly toward the axial rearward end.

These and other aspects of the present invention will be more fully understood following a review of this specification and drawings.

DETAILED DESCRIPTION

Figure 1:
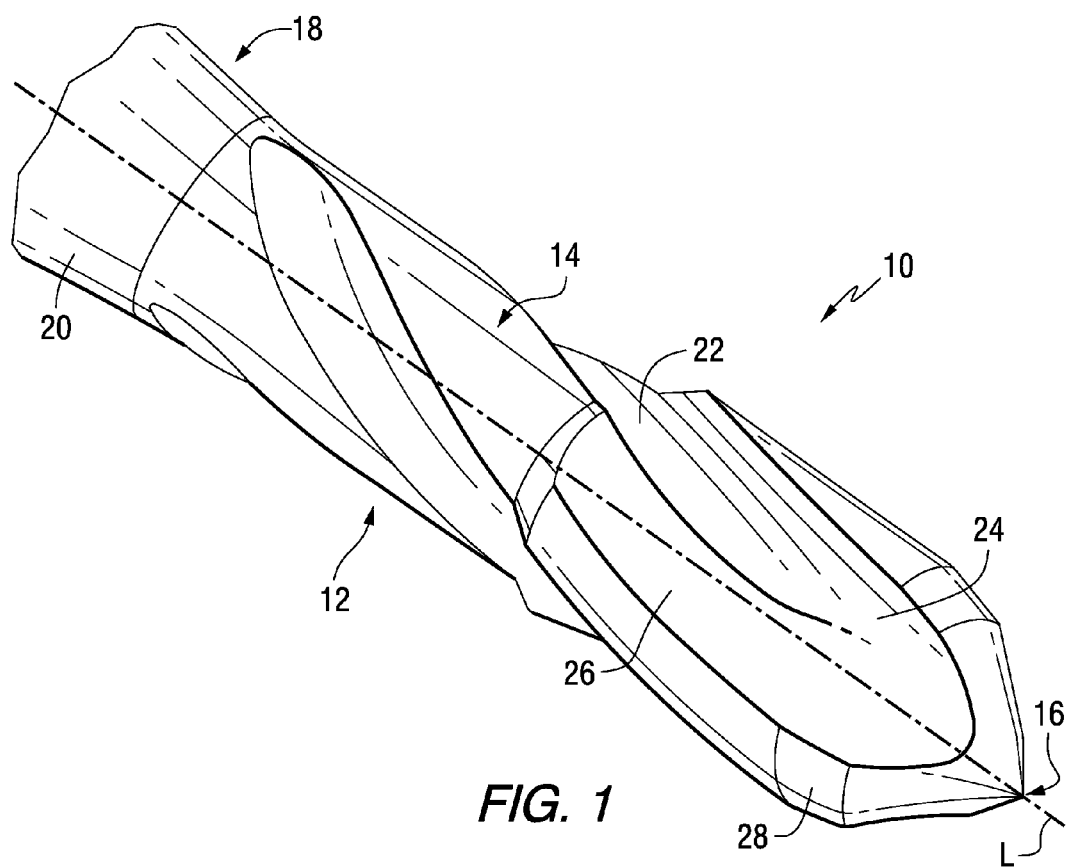
FIG. 1 is an isometric view of a cutting tap (without cutting threads formed thereon), in accordance with an aspect of the invention.

Referring now to the Figures, there is illustrated a cutting tap 10, in accordance with an aspect of the invention. The cutting tap 10 includes an elongate tap body 12 with a central longitudinal axis L (e.g. cutting axis) having an axial forward end 14 that generally defines and is configured as a cutting or tapping end. In one aspect, the axial forward end 14 terminates in a working center or point 16. The cutting tap 10 also includes an axial rearward end 18 including, for example, a shank 20. In one aspect, the cutting tap 10 is initially made or formed of, for example, a carbide blank (or similar materials as desired) wherein the axial rearward end 18 and, particularly, the shank 20 thereof is configured for securing or positioning or holding the tap body 12 (i.e. the carbide blank) in a grinding or cutting machine for making or grinding the cutting tap 10.

The cutting tap 10 includes a main flute 22 and a correction grind 24 formed in the axial forward end 14 of the tap body 12. The correction grind 24 is formed integrally with the main flute 22. In one aspect, the correction grind 24 is adjacent to the cutting point 16 and the main flute 22, which may be, for example, helical or spiral or straight, is axially rearward of the correction grind 24.

The cutting tap 10 also includes a reinforced land 26 and a chamfered area 28. In one aspect, the reinforced land 26 is adjacent the main flute 22. The reinforced land 26 increases the cross-sectional area of the tap 10, as is shown, for example in FIG. 3D. This increases torsional strength as well as stiffness. Typically, a spiral fluted tap will have a cross-sectional shape that is quite uniform throughout its length, although it's normal for its area to increase due to a positive core taper. The reinforced land 26 is a result of leaving, due to the unique motion of the grinding wheel relative to the tap 10 of the invention, material that would normally be removed in conventional flute grinding.

In accordance with an aspect of the invention, the correction grind 24 and the main flute 22 are formed or configured to have a variable helix angle. In one aspect, the correction grind 24 and the main flute 22 are formed or configured to have a continuously variable helix angle beginning at the axial forward end 14 of the tap body 12 and extending rearwardly toward the axial rearward end 18. In another aspect, the correction grind 24 and the main flute 22 are formed or configured to have a continuously variable helix angle that increases from low to high beginning at the axial forward end 14 of the tap body 12 and extending rearwardly toward the axial rearward end 18.

Figure 2D:
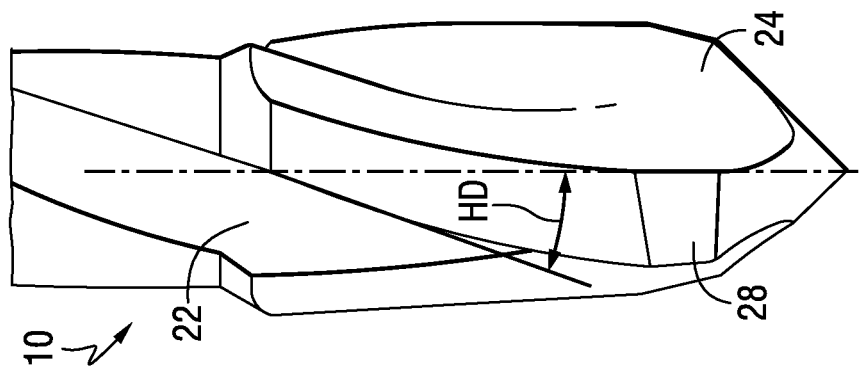
FIGS. 2A-2D are side views of the cutting tap illustrated in FIG. 1 showing variable helix angles, in accordance with aspects of the invention.
Figure 2C:
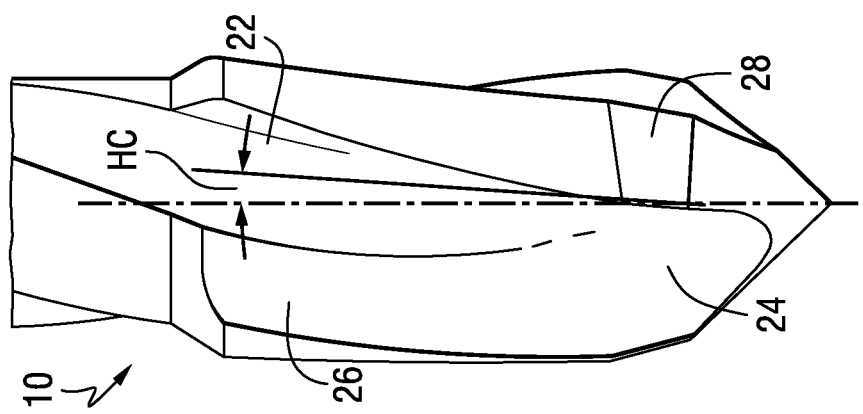
Figure 2B:
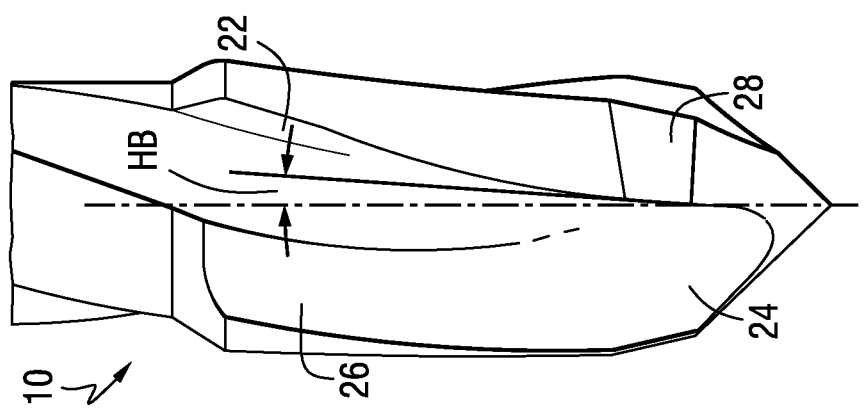
Figure 2A:
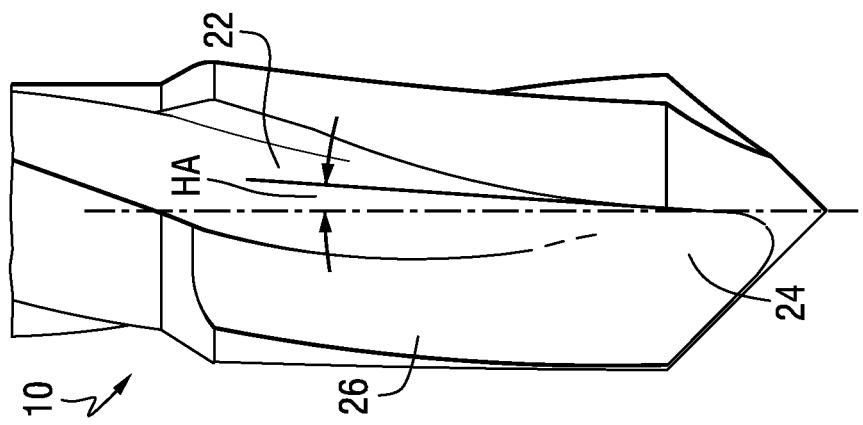

In one example, FIGS. 2A-2D are side views of the cutting tap illustrated in FIG. 1 showing variable helix angles, in accordance with aspects of the invention. For example, FIG. 2A shows a helix angle HA=5 degrees at a location axially forward of the chamfer 28 and in the area of the correction grind 24. FIG. 2B shows a helix angle HB=5 degrees at a location in the area of the chamfer 28 and also in the area of the correction grind 24. FIG. 2C shows a helix angle HC=7 degrees at a location axially rearward of the chamfer 28 and in the area of the correction grind 24. FIG. 2D shows a helix angle HD=22 degrees at a location axially rearward of the correction grind 24 and in the area of the main flute 22.

In one aspect of the invention, the correction grind 24 is formed or configured to have a helix angle in the range of about 1 degree to about 15 degrees. In another aspect, the main flute 22 is formed or configured to have a helix angle in the range of about 2 degrees to about 30 degrees. In one aspect, the correction grind 24 helix angle is less than the helix angle of the main flute 22.

Figure 3:
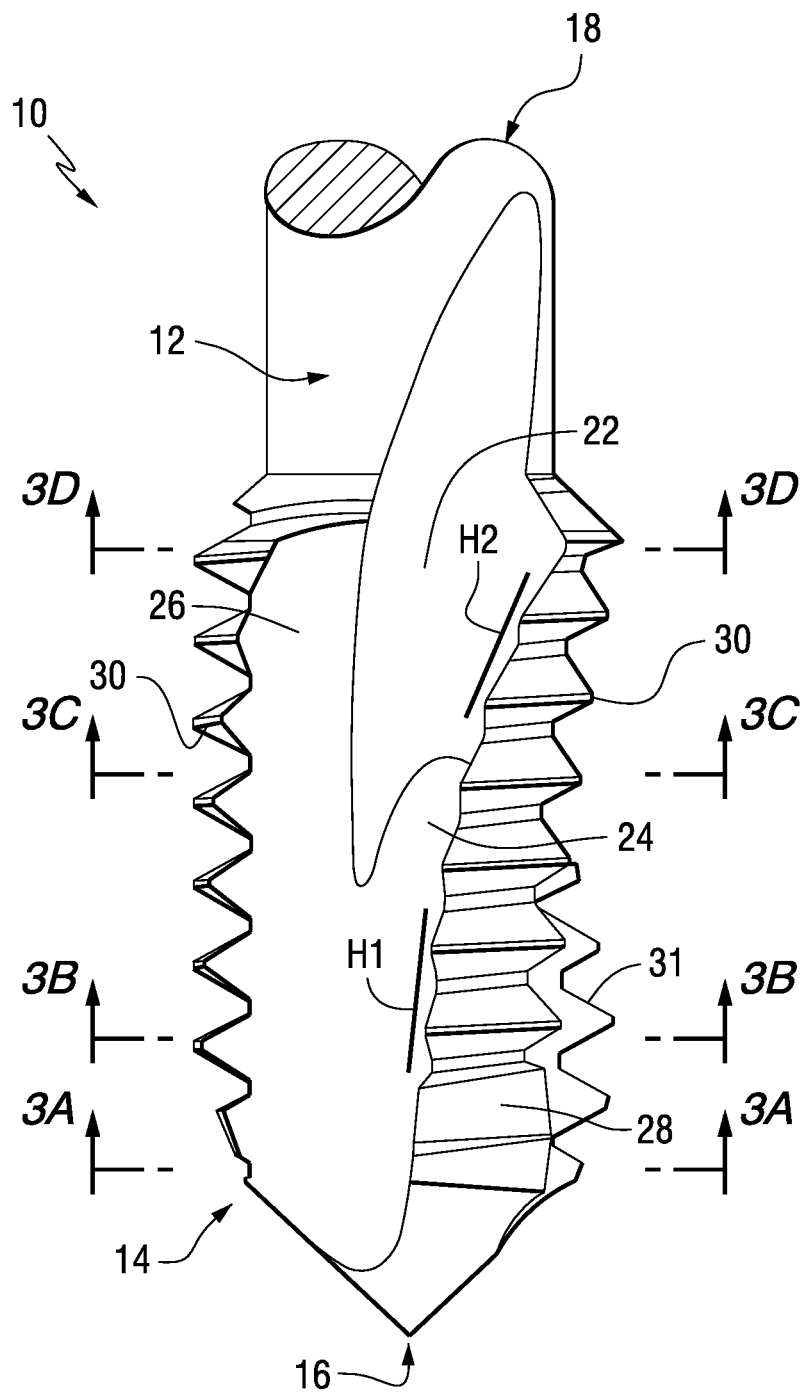
FIG. 3 is a partial isometric view of the cutting tap illustrated in FIG. 1 (with cutting threads), in accordance with an aspect of the invention.

FIG. 3 is a partial isometric view of the cutting tap 10 (illustrated in FIG. 1) with cutting or tapping threads 30, including first full thread 31, formed in the axial forward end 14 of the tap body 12, in accordance with an aspect of the invention. It will be appreciated that the cutting tap 10 includes multiple correction grind 24/main flute 22 configurations disposed about the periphery thereof and, in this particular example, includes three (3) correction grind 24/main flute 22 configurations as best illustrated in FIGS. 3A-3D.

Figure 3A:
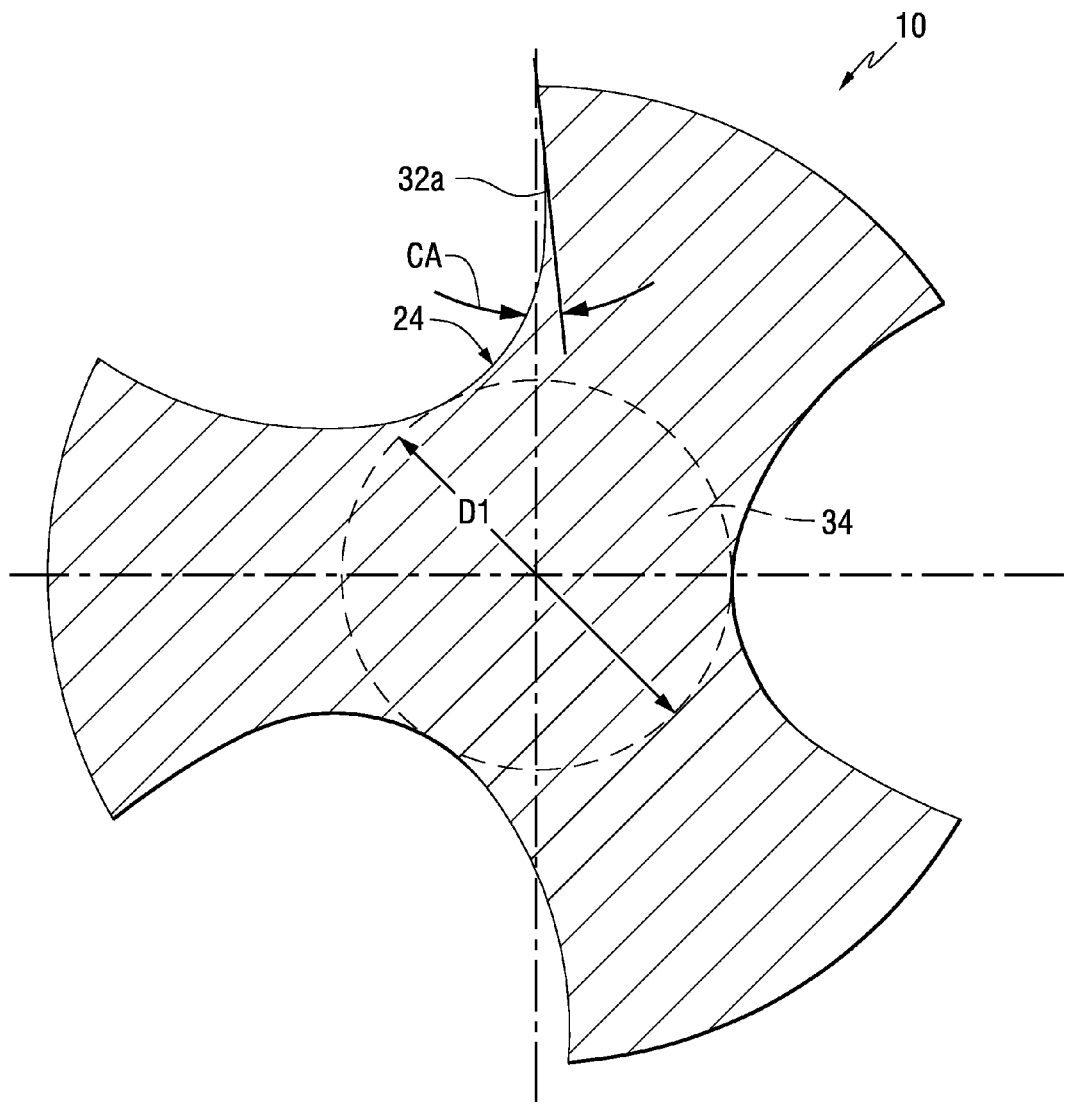
FIG. 3A is a sectional view taken along line 3A-3A of FIG. 3, in accordance with an aspect of the invention.

FIG. 3A is a sectional view taken along line 3A-3A of FIG. 3 adjacent the cutting point 16 in the area of the correction grind 24, in accordance with an aspect of the invention. A cutting face 32A includes a slightly positive cutting angle CA. In addition, a core portion 34 of the tap body 12 in this sectional view includes a core diameter D1.

Figure 3B:
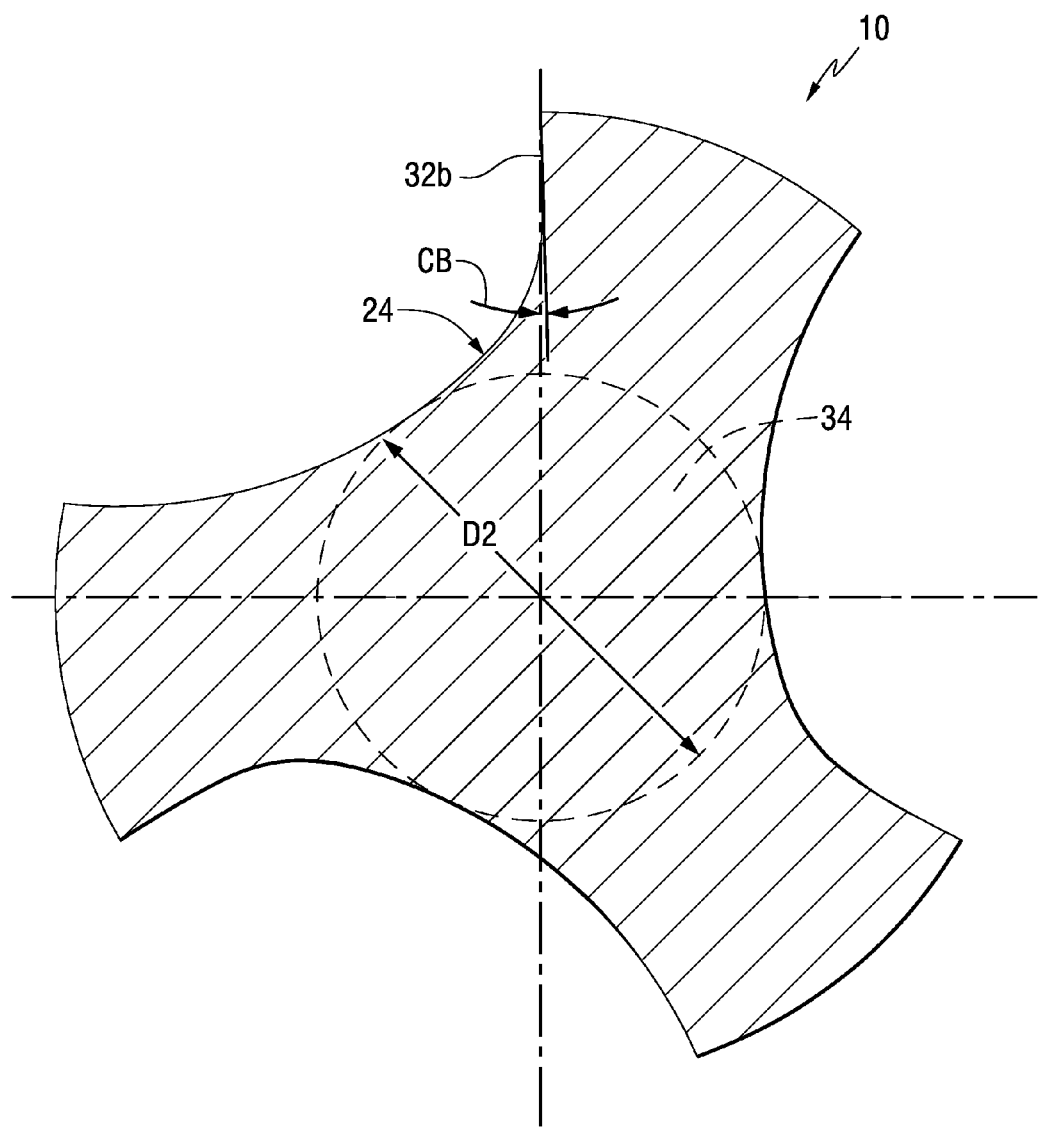
FIG. 3B is a sectional view taken along line 3B-3B of FIG. 3, in accordance with an aspect of the invention.

FIG. 3B is a sectional view taken along line 3B-3B of FIG. 3 adjacent the first full thread 30 also in the area of the correction grind 24, in accordance with an aspect of the invention. A cutting face 32B includes a neutral or approximately 0 degree cutting angle CB. In one aspect, angle CB can be a positive cutting angle. In addition, a core portion 34 of the tap body 12 in this sectional view includes a core diameter D2.

Figure 3C:
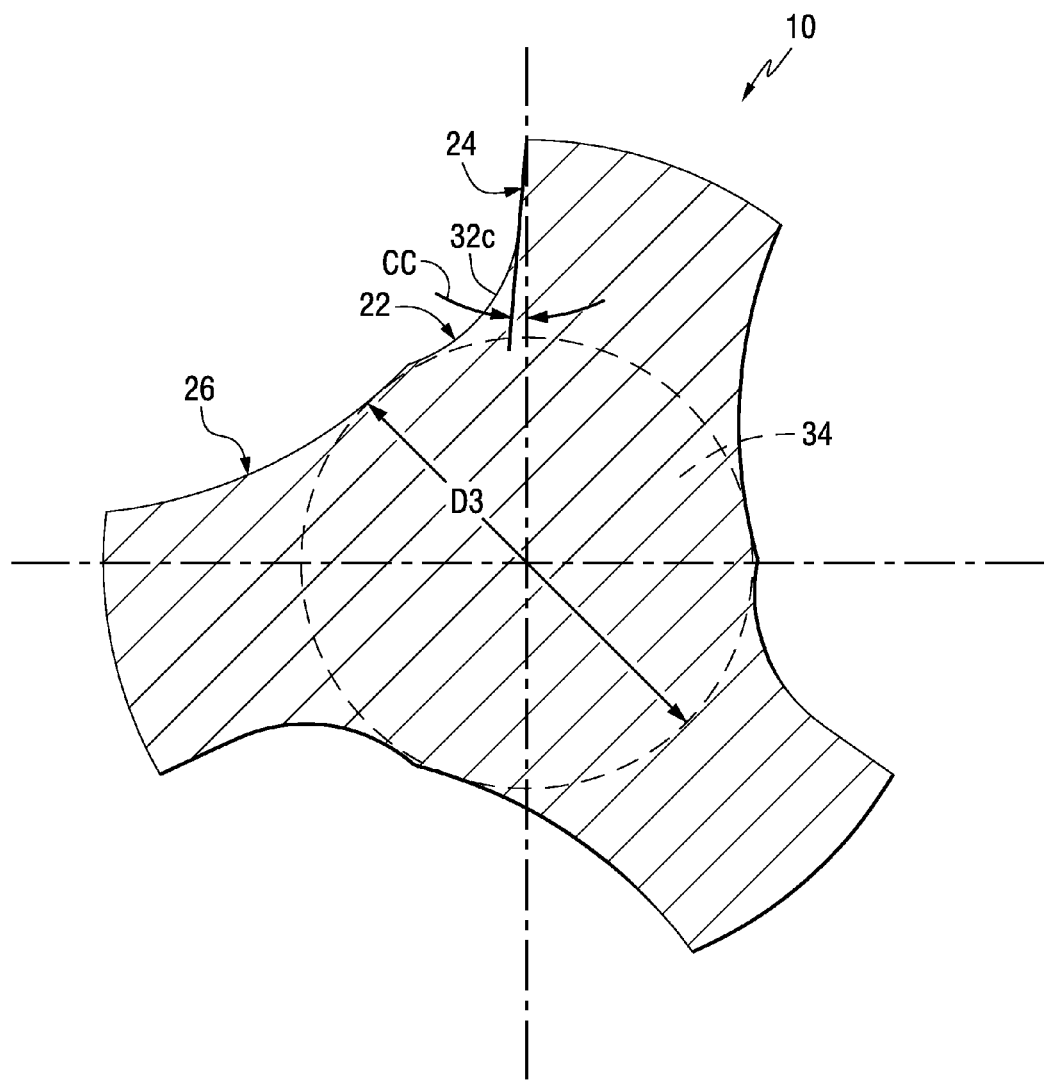
FIG. 3C is a sectional view taken along line 3C-3C of FIG. 3, in accordance with an aspect of the invention.

FIG. 3C is a sectional view taken along line 3C-3C of FIG. 3 adjacent the end area of the correction grind 24, in accordance with an aspect of the invention. A cutting face 32C includes a negative cutting angle CC. In addition, a core portion 34 of the tap body 12 in this sectional view includes a core diameter D3.

Figure 3D:
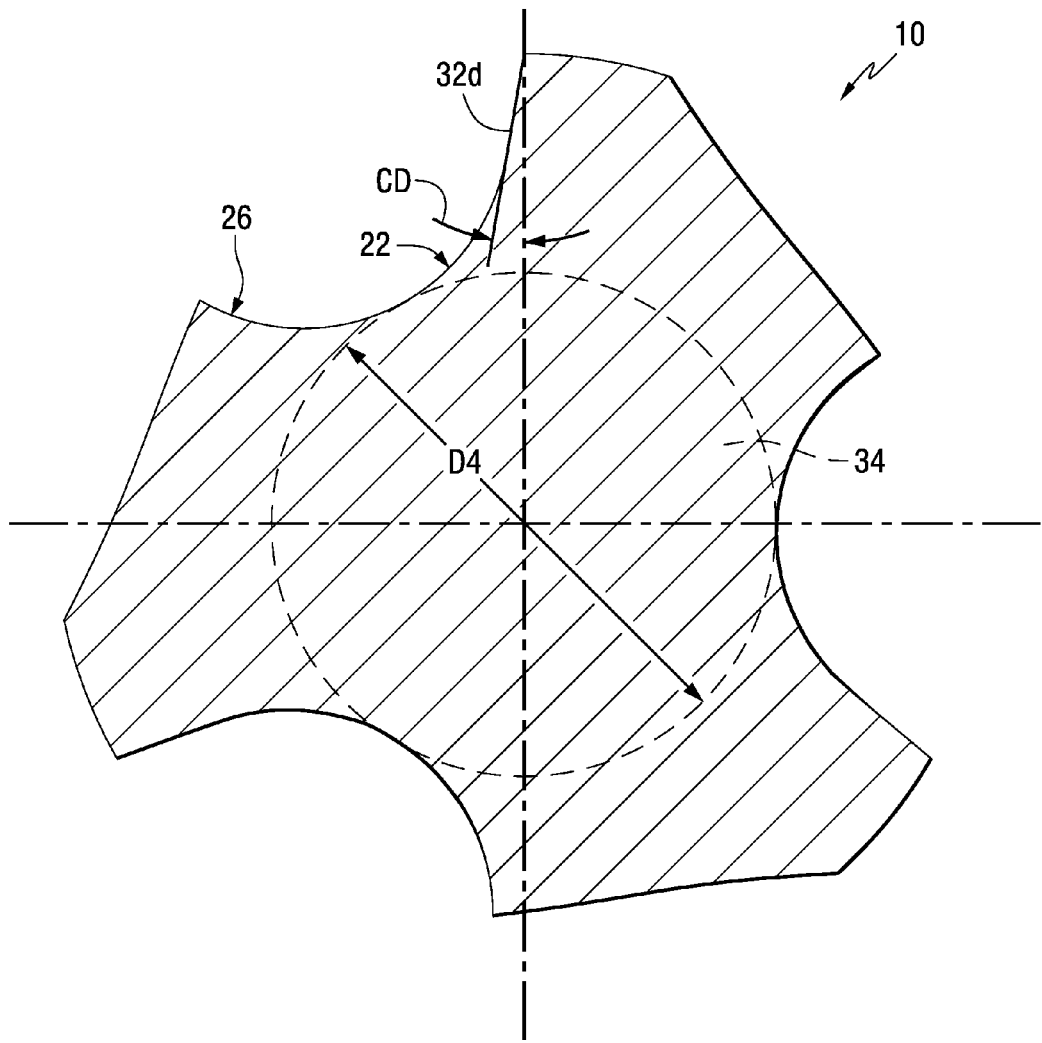
FIG. 3D is a sectional view taken along line 3D-3D of FIG. 3, in accordance with an aspect of the invention.

FIG. 3D is a sectional view taken along line 3D-3D of FIG. 3 adjacent the end of the threads 30, in accordance with an aspect of the invention. A cutting face 32D includes a negative cutting angle CD. In addition, a core portion 34 of the tap body 12 in this sectional view includes a core diameter D4.

In one aspect of the invention, the cutting tap body 12 is formed or configured to have a core portion 34 with a core diameter D that increases along the central longitudinal axis from the axial forward end rearwardly toward the axial rearward end. In one example, D1<D2<D3<D4. Advantageously, this provides increased strength for the cutting tap 10 during a cutting or tapping operation.

In association with the description of the cutting tap 10 set forth herein, a method of making the cutting tap 10 is also provided, in accordance with an aspect of the invention. A method of making the cutting tap 10 includes: providing the elongate tap body 12 having the axial forward end 14, the axial rearward end 18 and central longitudinal axis L; securing, holding or positioning the axial rearward end 18 (e.g. shank 20) of the tap body 12 in a grinding machine; and forming in the axial forward end 14 of the tap body 12 correction grind 24 and main flute 22 in one continuous grinding operation.

In one aspect, the method further includes grinding the correction grind 24 and the main flute 22 sequentially while the tap body 12 remains secured in the grinding machine. In addition, the method further includes forming the correction grind and the main flute to have a smooth transition therebetween. In conventional flute/correction grind grinding, the grinding wheel follows two separate paths. Where they intersect, there must necessarily be a 'rough transition', with the degree of roughness depending upon how different the two paths are. But nevertheless, there must be an acute change in the shape in that transition area. Conversely, in the method of the present invention, the same grinding wheel makes both grinds, and smoothly and fluidly transitions from one feature to the next. The advantage is that, whereas it has been demonstrated that damage occurs to the known taps explicitly in the area of the transition because cut chips don't move smoothly from one feature to the next, with a smooth transition (no sharp interruption in the shape) the chips will flow smoothly, not hang up or otherwise interfere with the tap threads, and thus, not damage the tap as readily.

In another aspect of the method of the invention, the correction grind 24 and the main flute 22 are formed or configured to have a variable helix angle. In one aspect, the correction grind 24 and the main flute 22 are formed or configured to have a continuously variable helix angle beginning at the axial forward end 14 of the tap body 12 and extending rearwardly toward the axial rearward end 18. In another aspect, the correction grind 24 and the main flute 22 are formed or configured to have a continuously variable helix angle that increases from low to high beginning at the axial forward end 14 of the tap body 12 and extending rearwardly toward the axial rearward end 18.

In another aspect of the method of the invention, the main flute 22 is formed to have a spiral or helical configuration. However, it will be appreciated that the main flute 22 may have other configurations, e.g. straight. The method also includes forming cutting or tapping threads 30 and chamfer 28 in the tap body 12.

The method can also include forming or grinding the cutting tap 10 to include reinforced land 26. In one aspect, the reinforced land 26 is formed adjacent the main flute 22.

In one aspect of the method of the invention, the cutting tap body 12 is formed or configured to have core portion 34 with core diameter D that increases along the central longitudinal axis from the axial forward end rearwardly toward the axial rearward end.

In another aspect of the invention, the method further includes the tap body 12 moving axially, radially and transversely into a grinding wheel of the grinding machine to create the correction grind 24 and the main flute 22 with variably increasing helix angle in one continuous motion. The method also further including forming the reinforced land 26 in the same continuous motion. In one aspect, the correction grind 24, reinforced land 26 and main flute 22 are ground in one continuous operation with the grinding wheel never losing contact with the tap 10.

Whereas particular aspects of this invention have been described above for purposes of illustration, it will be evident to those skilled in the art that numerous variations of the details of the present invention may be made without departing from the invention.

The invention claimed is:

1. A method of making a cutting tap, comprising:
providing an elongate tap body having an axial forward end, an axial rearward end and a central longitudinal axis;
securing the axial rearward end of the tap body in a grinding machine; forming a correction grind and a main flute in the axial forward end of the tap body with a grinding wheel in one continuous grinding operation, wherein the correction grind is adjacent to the cutting point, and the main flute is axially rearward of the correction grind; and
wherein the grinding wheel does not lose contact with the tap body during the continuous grinding operation; and forming a reinforced land in the tap body, wherein the reinforced land is adjacent the main flute.

2. The method of claim 1, further including grinding the correction grind and the main flute sequentially while the tap body remains secured in the grinding machine.

3. The method of claim 1, further including forming the correction grind and the main flute to have a variable helix angle.

4. The method of claim 1, further including forming the correction grind and the main flute to have a continuously variable helix angle beginning at the axial forward end of the tap body and extending rearwardly toward the axial rearward end.

5. The method of claim 1, further including forming the correction grind and the main flute to have a continuously variable helix angle that increases from low to high beginning at the axial forward end of the tap body and extending rearwardly toward the axial rearward end.

6. The method of claim 1, further including forming the correction grind to have a helix angle in the range of about 1 degree to about 15 degrees.

7. The method of claim 1, further including forming the main flute to have a helix angle in the range of about 2 degrees to about 30 degrees.

8. The method of claim 1, further including forming the correction grind and the main flute to have a smooth transition therebetween.

9. The method of claim 1, further including forming the main flute to have a spiral configuration.

10. The method of claim 1, further including forming threads and a chamfer in the tap body.

11. The method of claim 1, further including the tap body moving axially, radially and transversely into a grinding wheel of the grinding machine to create the correction grind and the main flute with variably increasing helix angle in one continuous motion.

12. The method of claim 11, further including forming a reinforced land in the same continuous motion.

13. The method of claim 1, further including forming the cutting tap to have a core diameter that increases along the central longitudinal axis from the axial forward end rearwardly toward the axial rearward end.

14. A cutting tap formed by the method of claim 1.

15. A method of making a cutting tap, comprising:
providing an elongate tap body having an axial forward end terminating in a point, an axial rearward end including a shank and a central longitudinal axis;
securing the shank of the tap body in a grinding machine;
forming in the axial forward end of the tap body a correction grind adjacent the point and a main flute axially rearward of the correction grind in one continuous grinding operation with the grinding wheel never losing contact with the tap during the continuous grinding operation, wherein the correction grind and the main flute are ground sequentially while the tap body remains secured in the grinding machine; further including forming the correction grind and the main flute to have a continuously variable helix angle that increases from low to high beginning at the axial forward end of the tap body and extending rearwardly toward the axial rearward end; and forming a reinforced land in the tap body, wherein the reinforced land is adjacent the main flute.

16. The method of claim 15, further including the tap body moving axially, radially and transversely into a grinding wheel of the grinding machine to create the correction grind and the main flute with variably increasing helix angle in one continuous motion.

17. The method of claim 16, further including forming a reinforced land in the same continuous motion.

* * * * *